(12) United States Patent
Eudier et al.

(10) Patent No.: US 9,259,875 B2
(45) Date of Patent: Feb. 16, 2016

(54) METHOD FOR CONTROLLING THE BELL OF A BLOWING NOZZLE

(71) Applicant: SIDEL PARTICIPATIONS, Octeville sur Mer (FR)

(72) Inventors: Fabien Eudier, Octeville-sur-Mer (FR); Nicolas Rousseau, Octeville-sur-Mer (FR); Laurent Danel, Octeville-sur-Mer (FR); Frederic Lecomte, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 138 days.

(21) Appl. No.: 14/055,925

(22) Filed: Oct. 17, 2013

(65) Prior Publication Data
US 2014/0042658 A1 Feb. 13, 2014

Related U.S. Application Data

(62) Division of application No. 12/752,770, filed on Apr. 1, 2010, now Pat. No. 8,602,771.

(30) Foreign Application Priority Data

Apr. 2, 2009 (FR) ...................................... 09 52129

(51) Int. Cl.
*B29C 49/12* (2006.01)
*B29C 49/58* (2006.01)
*B29C 47/92* (2006.01)

(52) U.S. Cl.
CPC ................. *B29C 49/12* (2013.01); *B29C 47/92* (2013.01); *B29C 49/58* (2013.01); *B29C 2049/1204* (2013.01); *B29C 2049/129* (2013.01);

(Continued)

(58) Field of Classification Search
None
See application file for complete search history.

(56) References Cited

U.S. PATENT DOCUMENTS 3,993,427 A † 11/1976 Kauffman
6,576,171 B1 6/2003 Devenoges
(Continued)

FOREIGN PATENT DOCUMENTS

DE 10 2008 005 311 A1 7/2009
EP 1 066 149 B1 6/2002
(Continued)

OTHER PUBLICATIONS

French Preliminary Search Report for FR 0803276, dated Jan. 6, 2009.
(Continued)

*Primary Examiner* — Benjamin Schiffman
(74) *Attorney, Agent, or Firm* — Sughrue Mion, PLLC (57) ABSTRACT

A mould carrier unit having a stretching rod (10) borne by a slide (13) mobile between an inactive position and an active position where its free end reaches the bottom of the mould (2); a nozzle (15) including a fixed body (16) extended by a bell (20), which is mobile from an inactive position where its free edge (25) is held substantially at the same level as the free end (11) of the stretching rod (10) to an active position where it is sealingly applied against the inlet surface (4) of the mould (2), to close the circuit of the blowing fluid. The bell (20) includes a bar (21) provided with a stop (23), which stop (23) cooperates with a support (24) formed on the slide (13) to permit the bell (20) to pass from its active position to the inactive position with the same law of motion as the stretching rod (10).

8 Claims, 3 Drawing Sheets

(52) U.S. Cl.
CPC . *B29C2049/1252* (2013.01); *B29C 2049/1257* (2013.01); *B29C 2049/5817* (2013.01); *B29C 2049/5862* (2013.01); *B29C 2049/5875* (2013.01); *B29C 2049/5893* (2013.01); *B29C 2947/92571* (2013.01); *B29C 2947/92904* (2013.01)

(56) References Cited

U.S. PATENT DOCUMENTS

| | | |
|---|---|---|
| 6,722,868 B1 | 4/2004 | Evrard |
| 6,905,326 B2 | 6/2005 | Voth et al. |
| 7,004,745 B2 | 2/2006 | Galloni |
| 7,563,092 B2 | 7/2009 | Mie |
| 8,162,641 B2 | 4/2012 | Sperka |

FOREIGN PATENT DOCUMENTS

| | | |
|---|---|---|
| FR | 2 790 704 A1 | 9/2000 |
| FR | 2 798 093 A1 | 3/2001 |
| FR | 2 790 704 B1 | 7/2001 |
| FR | 2 876 942 A1 | 4/2006 |
| FR | 2 876 942 B1 | 8/2008 |
| WO | 02/24435 A1 | 3/2002 |
| WO | 02/34500 A1 | 5/2002 |
| WO | 2009/010505 A1 | 1/2009 |

OTHER PUBLICATIONS

Written Opinion on the Patentability of the Invention for FR 0952129 dated Feb. 4, 2009.

† cited by third party

FIG. 6

METHOD FOR CONTROLLING THE BELL OF A BLOWING NOZZLE

CROSS-REFERENCE TO RELATED APPLICATION

This is a Divisional Application of U.S. patent application Ser. No. 12/752,770 filed Apr. 1, 2010, which claims priority from France Patent Application No. 0952129 filed Apr. 2, 2009. The entire disclosures of the prior applications are considered part of the disclosures of the accompanying divisional application, and are hereby incorporated by reference.

FIELD OF THE INVENTION

The present invention relates to a mould carrier unit arranged in an installation for stretch blow-moulding preforms in order to obtain containers of the bottle type or the like, made of thermoplastic material. The invention relates, more particularly, to the control of the blowing nozzle in addition to the method which is used for carrying out this control.

DESCRIPTION OF THE PRIOR ART

In a mould carrier unit, the blowing nozzle consists of a fixed part which is attached to the support structure of said mould carrier unit, and a mobile part which is in the shape of a ring or bell, the role thereof being to close, at the correct moment, the circuit for transmitting high pressure fluid which is intended for the mould and, in particular, for the preform to be blow-moulded.

The control of the nozzle consists more specifically in displacing said bell between, on the one hand, an inactive position in which it is sufficiently remote from the mould to allow the passage of the means for positioning the preform and the means for handling the moulded container and, on the other hand, an active position where it is sealingly applied against the inlet surface of said mould, i.e. the surface which comprises the orifice through which the high pressure fluid is introduced, which fluid produces the blow-moulding and the formation of said container.

Blow-moulding installations operate at relatively high throughput rates and, as a result, the control of the movements of the various mobile parts and the coordination of all these movements are a major concern, in order to avoid accidental collisions which result in the stoppage of the machine.

Thus, for each mould carrier unit of a blow-moulding installation, it is necessary to be able to combine a plurality of movements: on the one hand, the movements of the transfer clamps which position the preforms and those which handle the containers which have just been blow-moulded and, on the other hand, the movements of the bell of the nozzle.

The document FR 2 876 942 (SIDEL) proposes an arrangement of a mould carrier unit and, in particular, means for controlling the displacement of the mobile equipment of the blowing nozzle and, in particular, of the bell in order to apply sealingly its free edge against the inlet surface of the mould, i.e. the surface which is open for the passage of blowing fluid, said bell covering the top of the blowing orifice and the neck of the preform installed in said orifice.

This displacement of the bell is controlled by means of a pneumatic actuator formed in a novel manner in the region of the nozzle so as to be partially insensitive to the very high pressure for blow-moulding the preform.

This arrangement has numerous advantages but at increased speed it is observed that this displacement of the bell of the nozzle does not respond to a sufficiently precise law of motion as might be encountered, for example, with the use of a control of the bell by means of a cam system, as disclosed in the document FR 2 790 704 (SIDEL).

However, in the case of blow-moulding installations in which the mould carrier unit uses a control with a cam system, as detailed in the aforementioned document, risks of contamination are present due to the use of mechanisms which require a minimum amount of maintenance and, in particular, lubrication of the moving parts, hence the presence of lubricants, grease or the like, capable of contaminating the immediate vicinity of the mould and the impression of the container.

The document WO 02/24435 (SIDEL) proposes a novel control of the stretching rod to shift it from its active position to its inactive position. This control consists of a single-action actuator used for placing in the active position, which actuator is then deactivated to permit the stretching rod to be lifted under the action of the pressure prevailing in the container after the formation thereof. This control does not make it possible to guarantee the position of the bell of the blowing nozzle relative to the upper surface of the mould, during its movement for shifting it from the active position to the inactive position.

These different types of control of the bell of the nozzle also do not allow the alteration, depending on the dimensions of the preforms, of the distance which separates the free edge of the bell from the inlet surface of the mould and, as a result, they do not offer the flexibility which is expected nowadays for this type of installation.

SUMMARY OF THE INVENTION

The present invention proposes an improvement which makes it possible to improve this type of blow-moulding installation, to make it more flexible, and which also makes it possible to resolve the problems encountered on the mould carrier units, as detailed in the aforementioned documents.

Firstly, the object of the present invention is to obtain maximum security in terms of the lifting of the bell of the nozzle, relative to a conventional control of the pneumatic type and the invention makes it possible, therefore, to inhibit the risks of collision between the transfer clamps for the moulded containers, in particular, and said nozzle bell.

According to a preferred embodiment, the present invention makes it possible to eliminate the control of the movement of lifting and lowering the bell, such as for example the control via a pneumatic actuator as disclosed in the aforementioned document FR 2 876 942. This may, in this case, achieve significant advantages in terms of maintenance of the mould carrier unit due to the elimination of the solenoid valve and cables connected to the power supply of the actuator for manoeuvring the bell; it also provides more accessibility to said mould carrier unit due to the elimination of this control of the actuator for manoeuvring the nozzle bell.

The invention also provides more flexibility in terms of movements of the bell of the nozzle of the mould carrier unit. It permits, by means of a single control, the travel of the bell to be parameterized according to the height of the neck of the preform, i.e. that of the container.

Due to the invention, this parameterization is now directly associated with the travel of the stretching rod, which itself is parameterized according to the dimensions of the containers to be manufactured. The mechanism for the manoeuvring and control of the stretching rod, whether it is a pneumatic actuator or an electrical system as disclosed, for example, in the document EP 1066149 (TETRA LAVAL), is made with a device for controlling the travel of said stretching rod.

The mould carrier unit according to the invention is intended to be associated with an installation for manufacturing containers of the bottle type, by a stretch blow-moulding operation of preforms arranged in appropriate moulds of the jack-knife type or the like, which unit comprises:

on the one hand, a stretching rod borne by a slide which is mobile along the axis of the mould with which it is associated, under the action of appropriate control means, which rod is mobile over a distance which is greater than the depth of said mould, between an inactive position where its free end is kept apart from the inlet surface of the mould to permit the passage of the means for transferring the preform and the moulded container, and an active position where its free end reaches the bottom of the mould, without coming into contact therewith, on the other hand, a nozzle comprising a body attached to the support structure of said mould carrier unit, which nozzle also comprises a telescopic sealed extension in the shape of a bell, partially insensitive, as in the aforementioned document FR 2 876 942, to very high blowing pressure, which bell is mobile under the action of appropriate means for passing from an inactive position where its free edge is held substantially at the same level as the free end of the stretching rod to a sealed active position where said free edge is sealingly applied against said inlet surface to close the circuit of the blowing fluid, and said bell comprises coupling means which cooperate with said slide to permit said bell to pass from its sealed active position to the inactive position with the same law of motion as said stretching rod.

As the bell of the nozzle is associated with the slide to shift it from its sealed active position to its inactive position, a movement which is easier to manage and to control is able to be imposed on said bell. The management of this movement facilitates the coordination of the simultaneous movements of the bell and the means for transferring the preform and the moulded container and it provides the possibility of adjusting, according to requirements, the distance which separates the inlet surface of the mould and the free edge of the bell.

According to a preferred arrangement of the invention, the means which cooperate with the slide to shift the bell of the nozzle from its sealed active position to its inactive position consist of a bar which is attached at one of its ends to said bell, and which comprises at its other end a stop, which stop cooperates with a support formed on said slide so as to be driven thereby during the return of the stretching rod to its inactive position, said bar being parallel to said stretching rod.

Still according to the invention, the mould carrier unit comprises means which make it possible to produce a temporary coupling, i.e. which may be deactivated, between the stop of the bar for driving the bell and the support of this stop which is formed on the slide, which coupling is effective over the portion of the travel of the stretching rod which corresponds to the displacement of said bell between its inactive position and its sealed active position.

According to a first embodiment, the temporary coupling means consist of a controlled locking device, which device, in the form of a pneumatic or electromagnetic actuator, is preferably arranged on the free end of the bar and its bolt cooperates with a strike plate located on the slide.

According to a variant, the temporary coupling means are of the magnetic type and comprise a magnet which is, for example, located at the free end of the bar on the stop, which magnet cooperates with the support formed on the slide.

Still according to the invention, a resilient member may be interposed between a shoulder formed on the body of the nozzle and a shoulder formed on the bell so as to apply said bell continuously against the inlet surface of the mould.

According to a further embodiment of the invention, the nozzle may also be made to form a pneumatic actuator which comprises a sleeve consisting of the bell and a fixed piston formed on the body of the nozzle, said actuator making it possible to displace said bell between its inactive position and its sealed active position and vice versa and, in this case, the bar for manoeuvring said bell carries out a secure return of said bell to its inactive position.

According to a further arrangement of the invention, the stretching rod is preferably controlled by means of an electrical system of the linear motor type.

The invention also relates to the method for controlling the bell of a blowing nozzle arranged in a moulding unit as detailed above, said method consisting:

in applying the bell of the nozzle against the inlet surface of the mould to close the circuit of the blowing liquid, simultaneously in manoeuvring the stretching rod to shift its free end from its inactive position corresponding substantially to that of said bell, to its active position for stretching the preform, and, after the blowing operation, in causing said bell to be manoeuvred by the drive means of the stretching rod, at the end of its return travel, over a distance which corresponds to the space between the inlet surface of the mould and the free end of the stretching rod when it is in its inactive position, thus shifting said bell from its active position for closing the blowing circuit to its inactive position, with a law of motion which corresponds to that of the stretching rod, i.e. a law which makes it possible to improve the coordination of the movements of the bell with those of the means for transferring the preform and the moulded container, after the blow-moulding operation.

Still according to the invention, the method for controlling the nozzle also consists in positively driving the bell between its inactive position and its active position, in applying it against the inlet surface of the mould by the implementation of a temporary coupling interposed between said bell and the slide for driving the stretching rod, said coupling being able to be deactivated when said bell is applied against said inlet surface of said mould.

According to a first embodiment, the implementation of the temporary coupling means is carried out by means of a mechanical lock controlled between the stop located at the free end of the bar and the slide.

According to a variant, the implementation of the temporary coupling means is carried out by means of a magnetic lock between the stop located at the free end of the bar and the slide.

Still according to the invention, the method for controlling the bell consists in accompanying the movement of applying the bell against the inlet surface of the mould by means of a resilient member interposed between the nozzle and said bell, forming a desmodromic-type control.

According to a variant of the invention, the method for controlling the bell also consists in activating said bell by means of a pneumatic actuator formed on the nozzle with a sleeve consisting of said bell and a piston formed on the body of said nozzle, shifting said bell from its inactive position to its sealed active position and vice versa, also in this case with a desmodromic-type control.

BRIEF DESCRIPTION OF THE DRAWINGS

The invention will be explained in further detail by means of the following description and the accompanying drawings, given by way of indication, and in which.

DETAILED DESCRIPTION OF THE INVENTION

Figure 1:
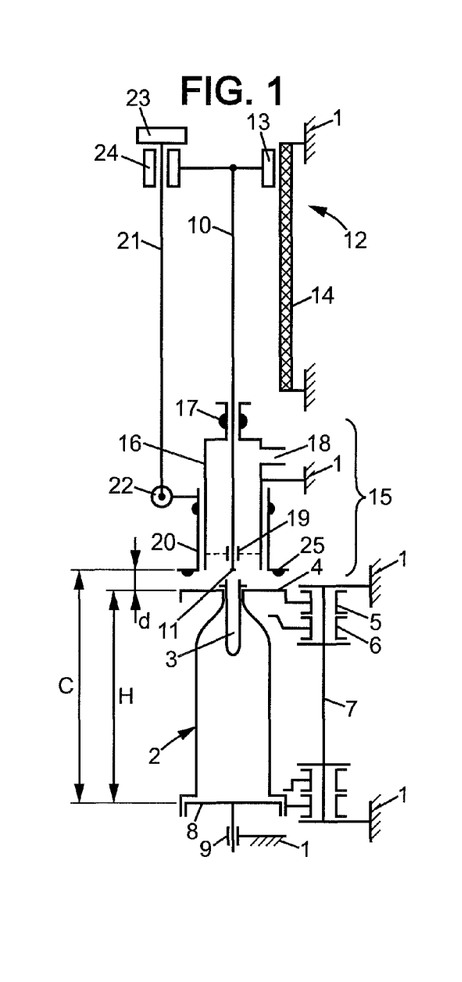
FIG. 1 shows schematically a mould carrier unit formed with means for driving the bell which are associated with the slide for driving the stretching rod.

FIG. 1 illustrates, schematically, a mould carrier unit of the type which may be found on the carousel of an installation for the manufacture of containers, bottles or the like, by a stretch blow-moulding operation of preforms made of thermoplastic material, PET or the like.

This mould carrier unit comprises a general support structure 1 which is attached to the carousel, not shown. The actual mould 2 which receives a preform 3 is located on this support structure. This mould 2 may be of the jack-knife type, as shown schematically, consisting conventionally of two half-shells and a base; the control device disclosed below may also be suitable for all types of moulds.

The preform 3 rests on the inlet surface 4 of the mould 2. This mould 2 comprises two parts which are articulated by means of bearings 5 and 6 on an axis 7 which is attached to the support structure 1 of the mould carrier unit and it also comprises a base 8 which is vertically mobile, guided in a slide 9.

The mould carrier unit comprises a rod 10 which carries out the stretching of the preform by the elongation of said preform as far as the bottom of the mould 2. This stretching rod 10 extends between its free end 11 which penetrates the preform to stretch said preform in the mould 2 and its end which is attached to an actuator device 12. On the side of this actuator device 12, the stretching rod 10 is borne by a slide 13 which cooperates with a slide 14 attached to the support structure 1.

The actuator device 12 is, for example, as disclosed in this embodiment, formed by a linear motor of which the primary motor, consisting of magnets, forms part of the slide 13 and of which the secondary motor, also consisting of magnets, forms part of the slide 14.

Between the mould 2 and the actuator device 12, the stretching rod 10 passes through the blowing nozzle 15. This nozzle 15 consists of two parts which are centred on the axis of the mould 2 and on the stretching rod 10.

One part of the nozzle 15 consists of a body 16 which is fixed, attached to the support structure 1 of the mould carrier unit, which body 16 is in the form of a tube of which one end is open to the inlet surface 4 of the mould and of which the other end comprises an orifice 17 provided with a seal which is suitable for the passage of the stretching rod 10. The body 16 also comprises, on the orifice 17 side, a pipe 18 for the passage of the blowing fluid which is introduced at very high pressure, in the order of 40 bar, for example, into the preform 3 for the shaping thereof.

This nozzle 15 makes it possible to convey the blowing fluid to the inlet of the mould 2 and, in particular, into the preform 3 to shape it into the mould 2 after the stretching thereof by means of the rod 10.

This stretching rod 10 is also guided by means of a bushing 19, which bushing 19 is carried by arms which are attached to the free end of the body 16 of the nozzle 15.

This body 16 extends over the inlet surface 4 of the mould 2 at a specific distance from this surface and the distance between the two permits the passage of the means which convey the preform 3 and then remove the container after the moulding thereof.

To obtain the seal between the body 16 and the surface 4 at the inlet of the mould, the space which prevails between the two, of annular shape, is filled by means of a sealed telescopic extension which forms the other part of the nozzle 15. This telescopic extension is in the form of a bell 20, concentric to the body 16 of the nozzle 15. This bell 20 is mobile, guided on the body 16 between an inactive position, as shown in FIG. 1 and an active position as shown in the following FIGS. 2 and 3, to close the space which separates the free end of said body 16 and the inlet surface 4 of the mould.

This bell 20, shown schematically in the form of a ring or a sleeve which encloses the body 16, is attached to a manoeuvring member. This manoeuvring member is shown, in terms of its operation, in the form of a bar 21, which extends parallel to the stretching rod 10. This bar 21 comprises, at one of its ends, a connection 22 with the bell 20 and, at its other end, a stop 23 which cooperates with an arrangement in the form of a support 24, arranged on the slide 13, which support 24 is also made in the form of a guide, i.e. it permits the passage and the guidance of the bar 21. The guidance between the bar 21 and the passage in the support 24 may be carried out with sufficient friction to cause the driving of said bar; drive means are detailed below.

The stop 23 is located at the free end of the bar 21 on the actuator 12 side, and this bar 21 slides, in the region of the support 24, as detailed below, during the majority of the travel of the stretching rod 10.

In the inactive position, the free end 11 of the stretching rod 10 and the free end 25 of the bell 20 are substantially at the same level, at a distance d from the inlet surface 4 of the mould 2. The travel C of the stretching rod 10 comprises this portion which corresponds to the distance d and it includes the total depth H of the mould 2.

Figure 2:
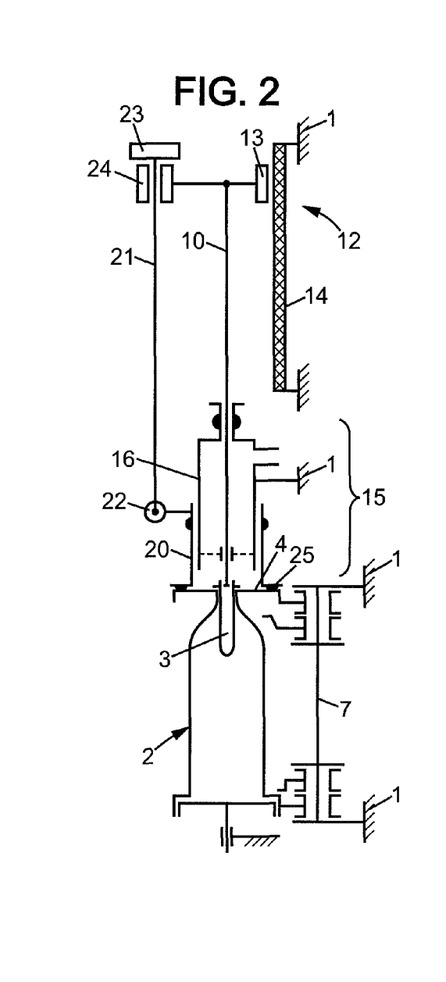
FIG. 2 shows the bell in the sealed active position.
Figure 3:
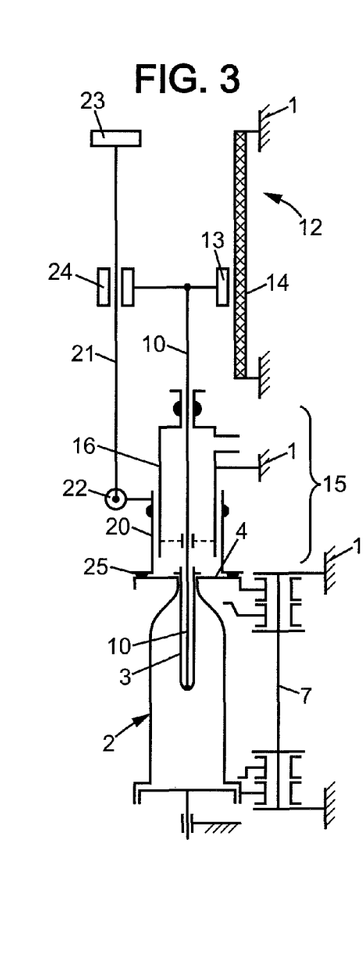
FIG. 3 shows the bell in the sealed active position and the stretching rod in the active position for stretching the preform.

It is noteworthy in the embodiment shown schematically in FIGS. 1 to 3, that the bell 20 is retained in the inactive position by means of its stop 23, via the support 24 of the slide 13. Also, as soon as the slide 13 is displaced, under the action of the actuator 12, to shift the stretching rod 10 from its inactive position into its active position, the bell 20 accompanies the movement of said rod 10, passing from its inactive position to a sealed active position, in contact with the inlet surface 4 of the mould 2. It accompanies the movement of the bar 10 as a result of its own weight, by friction between the bar 21 and the passage in the support 24, or by connecting means detailed below.

When the bell 20 is applied against the surface 4 of the mould 2, the stop 23 is halted and abandoned by the slide 13 which continues its travel to permit the rod 10 to stretch the preform 3 in the mould 2. The travel C of the stretching slide 13 is thus divided into two parts, as indicated above: a travel portion d for positioning the bell 20 in the sealed active position, and a travel portion H for producing the stretching of the preform 3. The law of motion of the slide 13 comprises a stoppage time or partial stoppage time between the two travel portions d and H to avoid the bell 20 impacting against the inlet surface 4 of the mould.

FIG. 2 shows the bell 20 in the sealed active position on the inlet surface 4 of the mould 2. It is noteworthy, as in FIG. 1, that the free end 11 of the stretching rod 10 is located substantially at the same level as the free end 25 of the bell 20.

FIG. 3 shows the continuation of the movement of the slide 13 and of the stretching rod 10 whilst the bell 20 is kept applied against the inlet surface 4 of the mould 2.

By a reverse movement, the stretching rod 10 is removed from the mould and passes from its extreme active position in the bottom of the mould 2 to its inactive position where its free end 11 is located at a distance d from the inlet surface 4 of said mould 2.

During this reverse movement, the support 24 of the slide 13 comes into contact with the stop 23 of the bar 21 and, as a result, it moves the bell 20 away, shifting it from its sealed active position to its inactive position, i.e. a position located at the distance d relative to the inlet surface 4 of the mould.

In the same manner as the movement for the stretching operation, this reverse movement for removing the stretching rod 10 is not continuous; it is also performed with a stoppage time, or partial stoppage time, at the moment when the support 24 of the slide 13 and the stop 23 which is at the end of the bar 21 approach one another, to avoid impacting against the stop 23.

The stop 23 of the bar 21 and the support 24 of the slide 13 form a type of coupling which makes it possible to coordinate the displacement of the bell 20 with that of the stretching rod 10 when said bell 20 passes from its sealed active position, in contact with the inlet surface 4 of the mould 2, to its inactive position.

This coupling may also be used advantageously to position the bell 20 in the sealed active position, i.e. to drive said bell and place its end 25 in contact with the inlet surface 4 of the mould 2.

According to the embodiment of the invention, shown by FIGS. 1 to 3, the stop 23 consists of a permanent magnet and the support 24 consists of an appropriate magnetic material. Thus a temporary coupling of the bell 20 with the slide 13 is obtained, which coupling, by an appropriate choice of the magnetic forces present, may be deactivated, or disengaged, i.e. it is automatically released when the bell 20 enters into contact with the inlet surface 4 of the mould 2.

Figures 4, 5:
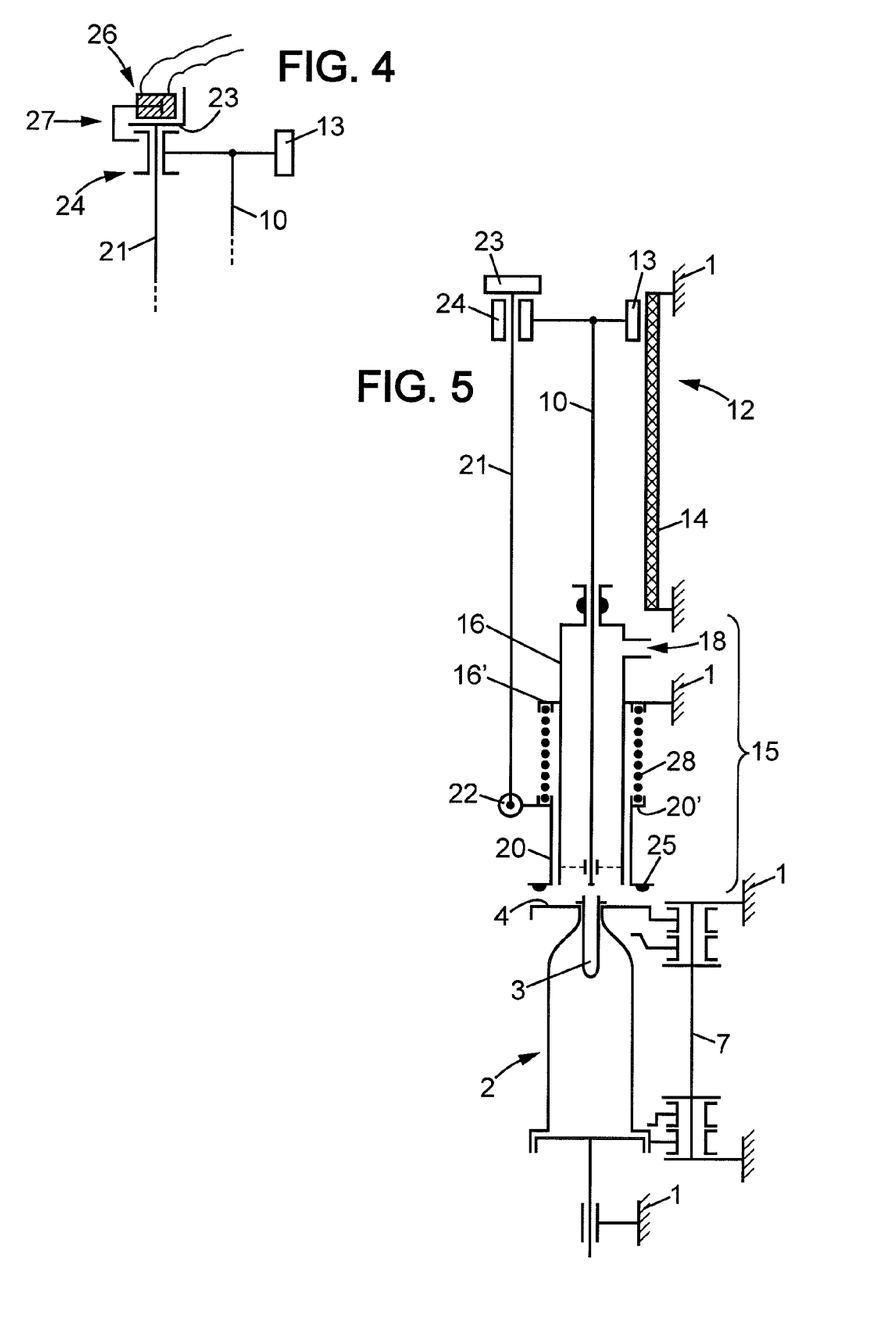
FIG. 4 shows a variant of the temporary coupling means between the rod and the stretching slide to shift the bell from its inactive position into its active position, in particular.
FIG. 5 shows a variant of the mould carrier unit, with additional means to shift the bell from its inactive position to its active position.

FIG. 4 shows a variant of the means which make it possible to couple, in a temporary manner, the stretching slide and the bar for driving the bell to coordinate their movements and, in particular, to coordinate their movements during the phase which corresponds to the active positioning of the bell 20 on the inlet surface 4 of the mould 2.

According to this embodiment of FIG. 4, the temporary coupling means make it possible to produce a positive driving of the rod 21; said coupling means consisting of a device in the form of a lock 26 which is controlled in an appropriate manner according to its type; this lock 26 may consist of an actuator of the pneumatic, hydraulic or electromagnetic type.

The lock 26 is preferably installed on the free end of the bar 21 and, in particular, on the stop 23. This lock 26 comprises a bolt 27 which cooperates with a strike plate formed on the support 24 of the stretching slide 13.

The lock 26 is activated, for example, during the phase of the bell 20 returning into the inactive position, when the support 24 enters into contact with the stop 23 to arrest said bell 20; this implementation may be automatic in this case.

The lock 26 is, in fact, active during the active positioning phase of the bell 20, over the portion d of the travel of the slide 13, a portion which is of very short length, in the order of 30 to 40 mm, for example.

FIG. 5 shows a mould carrier unit in which the nozzle 15 comprises additional means to place the bell 20 in the active position on the inlet surface 4 of the mould 2.

These additional means may, to avoid redundancy, be substituted for the temporary coupling means disclosed above, consisting of the lock 26 or the magnetic stop 23. These additional means have the result of restricting the bell 20 and shifting it from its inactive position into its sealed active position, in contact with the inlet surface 4 of the mould 2.

These additional means consist of a resilient member 28 which is interposed between a shoulder 16' formed around the body 16 of the nozzle and a shoulder 20' formed on the bell 20. This resilient member 28 in the form of a helical spring aims to maintain a pressure on the bell 20 in the direction of the inlet surface 4 of the mould 2, and in a permanent manner.

Thus, as soon as the stretching rod 10 is set in motion to leave its inactive position, the stop 23 accompanies said rod in its movement under the action of the spring 28 which exerts a pressure on the shoulder 20' of the bell 20.

In contrast, when the stretching rod 10 performs a return movement to its inactive position, the support 24 of the slide 13 arrests the stop 23 of the bar 21 and, against the action of the spring 28, it shifts the bell 20 from its sealed active position to the inactive position.

Figure 6:
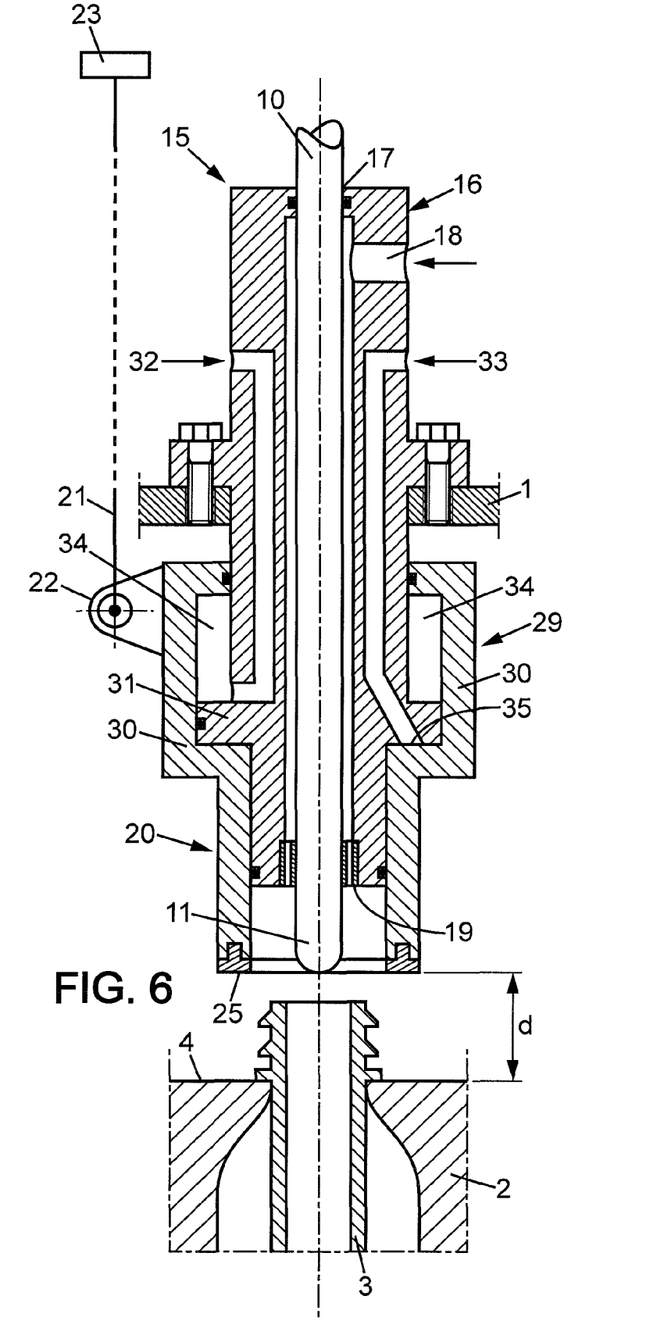
FIG. 6 shows a further variant of the mould carrier unit, with additional means to shift the bell from its inactive position to its active position and vice versa.

FIG. 6 shows schematically a variant of the invention, which makes it possible to improve and secure the installations already equipped with means for manoeuvring the bell 20, to apply it against the surface 4 of the mould and to place it in the inactive position. This embodiment constitutes a type of improvement to the nozzle detailed in the aforementioned document FR 2 876 942.

In FIG. 6, only the part of the nozzle 15 comprising the body 16 with its bell 20 is shown schematically and the reference numerals of the preceding FIGS. 1 to 3 have been retained.

In this FIG. 6, the mould 2 may be seen with a portion of preform 3. The body 16 of the nozzle 15 is traversed over its entire length by the stretching rod 10 which is guided to the two ends of said body 16, on the one hand, in the region of its free end 11 by the bushing 19, and, on the other hand, at the other end by a single orifice 17 with appropriate sealing means. This body 16 also comprises an orifice 18 for the introduction of the high-pressure blowing fluid. As above, the body 16 of the nozzle 15 is fixed to the support structure 1 of the mould carrier unit.

The movement of the bell 20 to pass from its active position to its inactive position and vice versa, is carried out by means of an actuator 29 which is incorporated in this nozzle-bell. The bell 20 comprises a part which is used as a sleeve 30 for the actuator 29 and the body 16 comprises an arrangement which is used as a piston 31. Conduits 32 and 33 are arranged in the body 16 to supply, respectively, the chambers 34 and 35 of this actuator 29.

The conduit 32 makes it possible to shift the bell 20 from its active position to its sealed inactive position and the conduit 33, in contrast, makes it possible to apply said bell 20 against the inlet surface 4 of the mould 2, i.e. to shift it from its inactive position to the sealed active position.

The movement of the bell 20 is, in fact, subjected as above, by means of the bar 21, to the movement of the slide for manoeuvring the stretching rod 10. Thus, when the stretching rod 10 passes from its inactive position into its active stretching position, the bell 20 passes from its inactive position to its active position by following the movement of the stretching rod 10, whilst at the same time manoeuvred due to the compressed air which enters in the region of the conduit 33.

In this embodiment, it is also no longer necessary for the stop 23 and the support 24 to form a magnetic coupling, as indicated above. This stop 23, located at the free end of the bar 21, is applied against the support 24 of the slide 13, it accompanies said stretching rod 10, up to the moment where the bell 20 rests on the inlet surface 4 of the mould 2.

After the stretch blow-moulding operation of the preform 3, the stretching rod 10 is retracted and, at the end of travel, after exposure of the blowing circuit to the open air to evacuate the high pressure which prevails in this blowing circuit, the bell 20 is also retracted. It is retracted in a redundant manner, on the one hand, by the stop 23 which is driven by the support 24 of the slide 13 at the end of travel of the retraction of the stretching rod 10 and, on the other hand, by the movement of the chamber 30 of the actuator 29 under the action of the pressure of the compressed air which is introduced into the chamber 34 via the conduit 32.

Thus, in this particular case of the return movement of the bell 20, a desmodromic-type control is obtained.

This type of control makes it possible to improve the control of the movement of the bell 20 and, as a result, to guarantee an improved coordination of the movements between this bell and the different means of transfer which are present, either to convey the preforms or to handle the moulded container obtained from the preform 3.

This assembly which comprises the bar 21 with its stop 23 and the support 24 on the slide 13, thus forms a type of accessory for improving mould carrier units which are mounted on the carousels of current installations and, in particular, the mould carrier units of the type of those disclosed in the aforementioned document FR 2 876 942.

What is claimed is:

1. A method for controlling the bell of a blowing nozzle comprising two parts, which nozzle is arranged in a moulding unit intended to be associated with an installation for manufacturing containers of the bottle type, by a stretch blow-moulding operation of preforms arranged in appropriate moulds of the jack-knife type or the like, which unit comprises:
    on the one hand, a stretching rod borne by a slide which is mobile along the axis x-x' of the mould with which the rod is associated, under the action of an actuator device, over a distance C which is greater than the depth H of said mould, between an inactive position where a free end of the rod is held at a sufficient distance from an inlet surface of said mould to permit the passage of the means for transferring the preform and the moulded container, and an active position where the free end reaches the bottom of said mould,
    on the other hand, a nozzle comprising a body attached to the support structure of said mould carrier unit, which nozzle also comprises a telescopic sealed extension, in the form of a bell, which bell is mobile under the action of said actuator device for passing from an inactive position where a free edge of the bell is held substantially at the same level as the free end of the stretching rod to a sealed active position where said free edge is sealingly applied against said inlet surface to close the circuit of the blowing fluid,
    wherein said bell comprises a manoeuvring member which cooperate with said slide to permit said bell to pass from the sealed active position to the inactive position with the same law of motion as said stretching rod,
said method comprising:
    applying said bell against the inlet surface of the mould to close the circuit of the blowing fluid,
    and simultaneously driving the stretching rod to shift the free end from the inactive position corresponding substantially to that of said bell, to the active position for stretching the preform,
    wherein, after the blowing operation, causing said bell to be manoeuvred by the drive means of said stretching rod, at the end of a return travel, over a length which corresponds to a distance d separating the inlet surface of the mould and the free end of said stretching rod, when it is in the inactive position, thus shifting said bell from its active position for closing the blowing circuit to its inactive position, with a law of motion which corresponds to that of said stretching rod,
    and wherein said manoeuvring member which cooperates with the slide to shift the bell from the sealed active position to the inactive position comprises a bar which is attached at one end to said bell and which comprises at the other end a stop, which stop cooperates with a support formed on said slide so as to be driven thereby during the return of said stretching rod to the inactive position, said bar being parallel to said stretching rod.

2. The method for controlling the bell of a blowing nozzle according to claim 1, comprising positively driving said bell between the inactive position and the active position, in applying the bell against the inlet surface of the mould by the implementation of a temporary coupling interposed between said bell and the slide for driving the stretching rod, said coupling being able to be deactivated when said bell is applied against said inlet surface of said mould.

3. The method for controlling the bell of a blowing nozzle according to claim 1, comprising implementing temporary coupling means by means of a mechanical locking device of the controlled type, which device being arranged between the stop located at the free end of the bar and the stretching slide.

4. The method for controlling the bell of a blowing nozzle according to claim 1, comprising implementing temporary coupling means by means of a magnetic-type device arranged between the stop located at the free end of the bar and the stretching slide.

5. The method for controlling the bell of a blowing nozzle according to claim 1, comprising accompanying the movement of applying the bell against the inlet surface of the mould by means of a resilient member interposed between the nozzle and said bell.

6. The method for controlling the bell of a blowing nozzle according to claim 1, comprising activating said bell by means of a pneumatic actuator formed on the nozzle with a sleeve consisting of said bell and a piston formed on the body of said nozzle, shifting said bell from its inactive position to its sealed active position and vice versa.

7. The method for controlling the bell of a blowing nozzle according to claim 1, comprising controlling said stretching rod by means of an actuator device of the linear motor type.

8. A method for controlling the bell of a blowing nozzle comprising two parts, wherein the nozzle is arranged in a moulding unit intended to be associated with an installation for manufacturing containers of the bottle type, by a stretch blow-moulding operation of preforms arranged in moulds, wherein the moulding unit comprises:
    a stretching rod borne by a slide which is mobile along a longitudinal axis of the mould with which the rod is associated, under the action of an actuator device, over a distance which is greater than a depth of said mould, between an inactive position where a free end of the rod is held at a sufficient distance from the inlet surface of said mould to permit the passage of the device that transfer the preform and the moulded container, and an active position where the free end reaches the bottom of said mould, a nozzle comprising a body attached to the support structure of said mould carrier unit, which nozzle also comprises a telescopic sealed extension, in the form of a bell, which bell is mobile under the action of said actuator device for passing from an inactive position where a free edge of the bell is held substantially at the same level as the free end of the stretching rod to a sealed active position where said free edge is sealingly applied against said inlet surface to close the circuit of the blowing fluid, wherein said bell comprises a manoeuvring member which cooperates with said slide to permit said bell to pass from the sealed active position to the inactive position with the same law of motion as said stretching rod, said method comprising:

in applying said bell against the inlet surface of the mould to close the circuit of the blowing fluid, and simultaneously in driving the stretching rod to shift the free end from the inactive position corresponding substantially to that of said bell, to the active position for stretching the preform, wherein, after the blowing operation, causing said bell to be manoeuvred by a drive for said stretching rod, at the end of a return travel of the stretching rod, over a length which corresponds to a distance separating the inlet surface of the mould and the free end of said stretching rod, when in the inactive position, thus shifting said bell from the active position for closing the blowing circuit to its inactive position, with a law of motion which corresponds to that of said stretching rod, and wherein said manoeuvring member which cooperates with the slide to shift the bell from the sealed active position to the inactive position comprises a bar which is attached at one end to said bell and which comprises at the other end a stop, which stop cooperates with a support formed on said slide so as to be driven thereby during the return of said stretching rod to the inactive position, said bar being parallel to said stretching rod.

* * * * *